(12) United States Patent
Guo et al.

(10) Patent No.: US 12,372,833 B2
(45) Date of Patent: Jul. 29, 2025

(54) MANUFACTURING METHOD OF DISPLAY PANEL, DISPLAY PANEL, AND DISPLAYING DEVICE

(71) Applicants: Hefei Xinsheng Optoelectronics Technology Co., Ltd., Anhui (CN); BOE Technology Group Co., Ltd., Beijing (CN)

(72) Inventors: Lei Guo, Beijing (CN); Liangliang Jiang, Beijing (CN); Heng Li, Beijing (CN); Ke Dai, Beijing (CN); Jiaqing Liu, Beijing (CN)

(73) Assignees: Hefei Xinsheng Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/913,780

(22) PCT Filed: Nov. 4, 2021

(86) PCT No.: PCT/CN2021/128661
§ 371 (c)(1),
(2) Date: Sep. 22, 2022

(87) PCT Pub. No.: WO2022/222421
PCT Pub. Date: Oct. 27, 2022

(65) Prior Publication Data
US 2024/0210763 A1 Jun. 27, 2024

(30) Foreign Application Priority Data
Apr. 23, 2021 (CN) .......................... 202110444591.1

(51) Int. Cl.
*G02F 1/1339* (2006.01)

(52) U.S. Cl.
CPC ...... *G02F 1/13394* (2013.01); *G02F 1/13396* (2021.01)

(58) Field of Classification Search
CPC ............. G02F 1/13394; G02F 1/13396; G02F 1/13415; G02F 1/133512; G02F 1/133514; G02F 1/136222
See application file for complete search history.

(56) References Cited

U.S. PATENT DOCUMENTS

| 8,212,976 B2* | 7/2012 | Park | G02F 1/136209 |
| | | | 349/110 |
| 8,724,057 B2* | 5/2014 | Tseng | G02F 1/136209 |
| | | | 349/110 |

(Continued)

FOREIGN PATENT DOCUMENTS

| CN | 107621715 A | 1/2018 |
| CN | 108037622 A | 5/2018 |

(Continued)

OTHER PUBLICATIONS

Espacenet English machine translation of CN209417486U (Year: 2019).*
CN202110444591.1 first office action dated Nov. 16, 2024.

*Primary Examiner* — Michael H Caley
*Assistant Examiner* — David Y Chung
(74) *Attorney, Agent, or Firm* — IPro, PLLC

(57) ABSTRACT

A manufacturing method of a display panel, a display panel and a displaying device. The display panel includes an opening area and a non-opening area, and the display panel includes: a first base plate and a second base plate arranged in align with each other, and a liquid-crystal layer between the first base plate and the second base plate. The first base plate includes: a first substrate, and a post spacer provided on one side of the first substrate that is close to the second base plate. The second base plate includes: a second sub- (Continued)

strate, and a spacing platform provided on one side of the second substrate that is close to the first base plate, wherein the spacing platform is located within the non-opening area. The post spacer is arranged opposite to the spacing platform.

14 Claims, 5 Drawing Sheets

(56) References Cited

U.S. PATENT DOCUMENTS

| | | | |
|---|---|---|---|
| 10,288,951 B2* | 5/2019 | Han | H10D 86/451 |
| 2010/0110022 A1 | 5/2010 | Chen et al. | |
| 2014/0071391 A1 | 3/2014 | Yang et al. | |
| 2015/0002793 A1* | 1/2015 | Jin | G02F 1/1333 |
| | | | 438/30 |
| 2017/0133413 A1* | 5/2017 | Park | G02F 1/1368 |
| 2017/0363922 A1* | 12/2017 | Tang | G02F 1/133345 |
| 2018/0129091 A1 | 5/2018 | Yao et al. | |
| 2018/0321534 A1* | 11/2018 | Koppal | G02F 1/1337 |
| 2021/0341780 A1 | 11/2021 | Dong et al. | |
| 2021/0364841 A1 | 11/2021 | Shao et al. | |

FOREIGN PATENT DOCUMENTS

| | | | | |
|---|---|---|---|---|
| CN | 108181765 A | | 6/2018 | |
| CN | 108776414 A | | 11/2018 | |
| CN | 109932844 A | | 6/2019 | |
| CN | 209417486 U | * | 9/2019 | |
| CN | 110603483 A | | 12/2019 | |
| CN | 110703511 A | | 1/2020 | |
| CN | 112099271 A | | 12/2020 | |
| CN | 113156717 A | | 7/2021 | |
| CN | 216387684 U | | 4/2022 | |
| JP | 2014052633 A | | 3/2014 | |

* cited by examiner

MANUFACTURING METHOD OF DISPLAY PANEL, DISPLAY PANEL, AND DISPLAYING DEVICE

CROSS-REFERENCE TO RELEVANT APPLICATIONS

The present application claim the priority of the Chinese patent application filed on Apr. 23, 2021 before the CNIPA, China National Intellectual Property Administration with the application number of 202110444591.1 and the title of "MANUFACTURING METHOD OF DISPLAY PANEL, DISPLAY PANEL AND DISPLAYING DEVICE", which is incorporated herein in its entirety by reference.

TECHNICAL FIELD

The present disclosure relates to the technical field of displaying, and more particularly, to a manufacturing method of a display panel, a display panel, and a displaying device.

BACKGROUND

Liquid Crystal Display (hereinafter referred to as LCD) is widely used because of its advantages of low power consumption, miniaturization, and lightness.

SUMMARY

The present disclosure provides a display panel, wherein the display panel includes an opening area and a non-opening area, and the display panel includes: a first base plate and a second base plate arranged in align with each other, and a liquid-crystal layer between the first base plate and the second base plate:
  the first base plate includes: a first substrate, and a post spacer provided on one side of the first substrate that is closer to the second base plate;
  the second base plate includes: a second substrate, and a spacing platform provided on one side of the second substrate that is closer to the first base plate, wherein the spacing platform is located within the non-opening area: and
  the post spacer is arranged opposite to and the spacing platform, and an orthographic projection on the second substrate of a first surface of the post spacer that is away from the first substrate is located within an area of an orthographic projection on the second substrate of a second surface of the spacing platform that is away from the second substrate.

In an alternative implementation, a geometric center of the orthographic projection of the first surface on the second substrate coincides with a geometric center of the orthographic projection of the second surface on the second substrate.

In an alternative implementation, a distance between a boundary of the orthographic projection of the first surface on the second substrate and a boundary of the orthographic projection of the second surface on the second substrate is greater than or equal to 10 μm.

In an alternative implementation, a distance between a boundary of an orthographic projection of the spacing platform on the second substrate and a boundary of the non-opening area is greater than or equal to 20 μm.

In an alternative implementation, a shape of the first surface and a shape of the second surface are the same.

In an alternative implementation, a shape of the second surface is an elliptical shape or a rectangle.

In an alternative implementation, a thickness of the spacing platform is greater than or equal to 0.9 μm, and less than or equal to 1.2 μm.

In an alternative implementation, a thickness of the post spacer is greater than or equal to 2 micrometers, and less than or equal to 2.6 μm.

In an alternative implementation, the post spacer includes a first post spacer, and a sum of a thickness of the first post spacer and a thickness of the spacing platform arranged opposite to the first post spacer is greater than a thickness of the liquid-crystal layer.

In an alternative implementation, the first post spacer facing the spacing platform is in a compression state, and the thickness of the spacing platform arranged opposite to the first post spacer is greater than a compression volume thickness of the first post spacer in the compression state.

In an alternative implementation, the post spacer further includes a second post spacer, the first post spacer and the second post spacer are arranged opposite to different spacing platforms, and a sum of a thickness of the second post spacer and a thickness of the spacing platform arranged opposite to the second post spacer is less than the thickness of the liquid-crystal layer.

In an alternative implementation, the second base plate further includes: a thin-film transistor provided on one side of the second substrate that is closer to the spacing platform, and a planarization layer provided on one side of the thin-film transistor that is away from the second substrate, and a material of the spacing platform includes a material of the planarization layer.

In an alternative implementation, a color-resistance layer is provided between the thin-film transistor and the planarization layer, an orthographic projection of the color-resistance layer on the second substrate covers the opening area, and the material of the spacing platform further includes a material of the color-resistance layer.

In an alternative implementation, a pixel electrode is provided on one side of the planarization layer that is away from the second substrate, an orthographic projection of the pixel electrode on the second substrate covers the opening area, and a material of the planarization layer includes an acrylic resin and a photoinitiator.

The present disclosure provides a displaying device, wherein the displaying device includes the display panel according to any one of the above embodiments.

The present disclosure provides a manufacturing method of a display panel, wherein the display panel includes an opening area and a non-opening area, and the manufacturing method includes:
  providing a first substrate and a second substrate;
  forming a post spacer on one side of the first substrate, to obtain a first base plate;
  forming a spacing platform on one side of the second substrate, to obtain a second base plate, wherein the spacing platform is located within the non-opening area;
  filling a liquid crystal on one side of the first base plate that is closer to the post spacer, or, filling a liquid crystal on one side of the second base plate that is closer to the spacing platform: and
  after the filling of the liquid crystal is completed, matching the first base plate and the second base plate, to obtain the display panel, wherein the post spacer is arranged opposite to the spacing platform, and an orthographic projection on the second substrate of a first surface of the post spacer that is away from the first substrate is located within an area of an orthographic projection on the second substrate of a second surface of the spacing platform that is away from the second substrate.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the related art, the figures that are required to describe the embodiments or the related art will be briefly introduced below: Apparently, the figures that are described below are embodiments of the present disclosure, and a person skilled in the art may obtain other figures according to these figures without paying creative work. It should be noted that the proportions in the drawings are merely illustrative and do not indicate the actual proportions.

DETAILED DESCRIPTION OF THE EMBODIMENTS

In order to make the objects, the technical solutions and the advantages of the embodiments of the present disclosure clearer, the technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

A liquid-crystal display panel usually includes an array base plate, a cell base plate, and a liquid crystal provided between the array base plate and the cell base plate. In order to ensure the designed cell gap of the liquid-crystal optical displaying, usually, a post spacer (PS) having an elastic restoring force is provided within the non-opening area of the cell base plate, as shown by "a" in FIG. 1.

Figure 1:
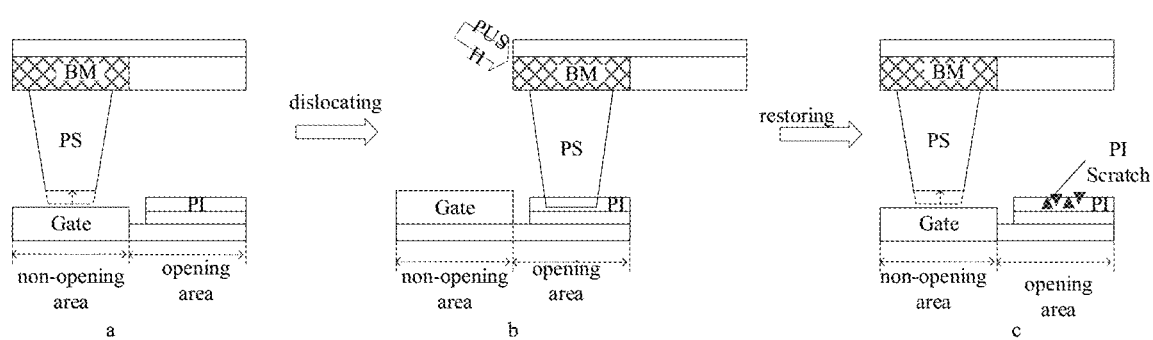
FIG. 1 shows a schematic diagram of the mechanism of the generation of spot imperfects of a display panel in the related art.
Figure 2:
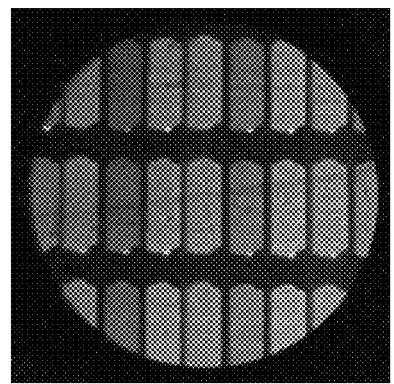
FIG. 2 shows a picture of spot imperfects of a display panel in the related art.

As shown by "b" and "c" in FIG. 1, when the liquid-crystal display panel is applied an intensive external force and thus a relative displacement or dislocation happens between the two base plates, the PS leaves the original non-opening area and intrudes into the opening area, to scratch the alignment film PI at the surface of the array base plate. The area where the PI film is scratched loses the anchoring capacity of inducing the aligned arrangement of the liquid crystal, to affect the normal alignment of the liquid crystal, and form PS-Mura-type imperfects, as shown in FIG. 2.

Figure 3:
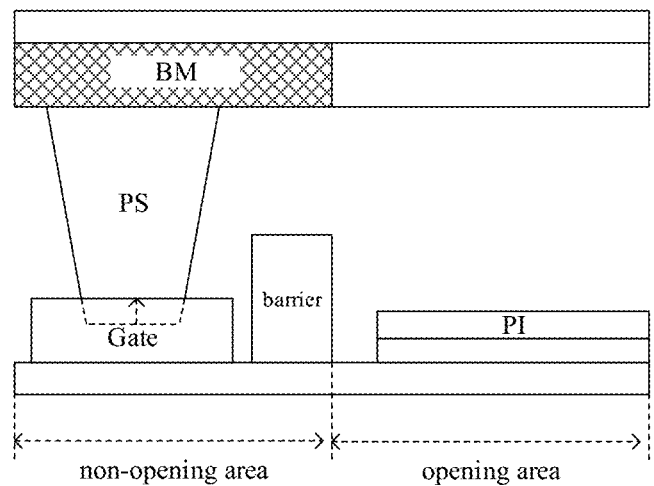
FIG. 3 shows a schematic sectional structural diagram of a display panel having a barrier layer in the related art.

In order to reduce the PS-Mura-type imperfects, in the related art, a high barrier layer is provided within the non-opening area of the array base plate around the PS, as shown in FIG. 3, wherein the barrier layer serves to block the PS from intruding into the opening area. When the liquid crystal display panel under the effect of an external force, the PS originally located within the non-opening area is displaced, the PS contacts the peripheral barrier layer in the movement path and may not continuously intrude into the opening area, thereby reducing the probability of the PS-Mura-type imperfects.

Figure 4:
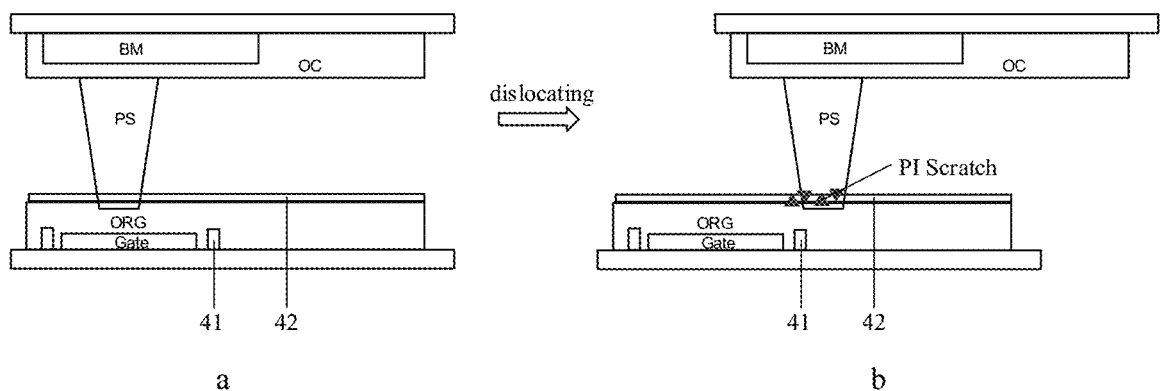
FIG. 4 shows a schematic diagram of the mechanism of the generation of spot imperfects of a display panel having a barrier layer in the related art.

However, the inventor finds that, in some television products, although the barrier layer is provided around the PS, the PS-Mura-type imperfects still exist. It is found by analysis that all of the array base plates of those products are provided with an organic film layer ORG of a high thickness, as shown by "a" in FIG. 4. The thickness of the organic film layer ORG is far greater than the thickness of the barrier layer 41, and the barrier layer 41 is buried under the thick organic film layer ORG, which causes that the function of the barrier layer 41 of blocking the sliding of the PS totally fails. As shown by "b" in FIG. 4, when those products are applied an intensive external force and thus a displacement and dislocation happen between the two base plates, bright spots of the same period as the arrangement period of the PS very easily appear, i.e., the PS-Mura-type imperfects.

Figure 5:
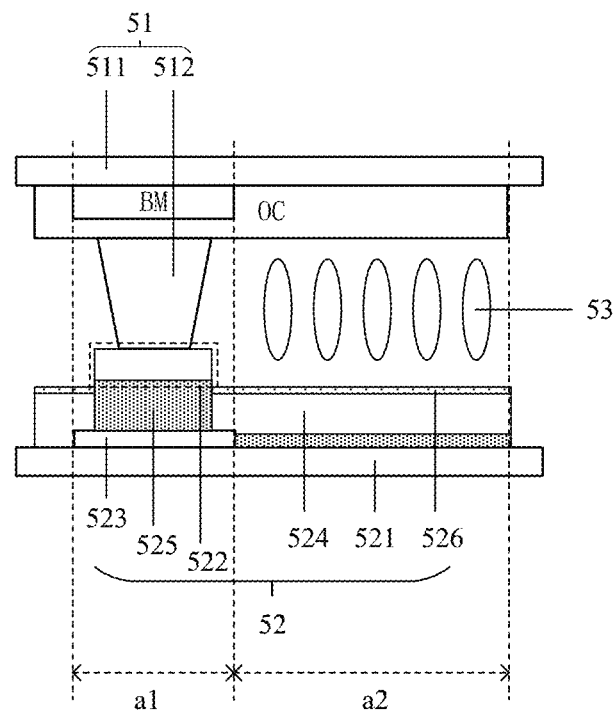
FIG. 5 shows a schematic sectional structural diagram of the display panel according to an embodiment of the present disclosure.

In order to solve the above problem, a display panel is provided by an embodiment of the present disclosure. Referring to FIG. 5, which shows a schematic sectional structural diagram of the display panel according to the embodiment of the present disclosure. The display panel includes a non-opening area a1 and an opening area a2, and the display panel includes: a first base plate 51 and a second base plate 52 arranged in align with each other, and a liquid-crystal layer 53 filled between the first base plate 51 and the second base plate 52.

The first base plate 51 includes: a first substrate 511, and a post spacer 512 provided on the side of the first substrate 511 that is close to the second base plate 52. The second base plate 52 includes: a second substrate 521, and a spacing platform 522 provided on the side of the second substrate 521 that is close to the first base plate 51, wherein the spacing platform 522 is located within the non-opening area "a1".

The post spacer 512 is arranged opposite to the spacing platform 522, and the orthographic projection on the second substrate 521 of a first surface of the post spacer 512 that is away from the first substrate 511 is located within the area of the orthographic projection on the second substrate 521 of a second surface of the spacing platform 522 that is away from the second substrate 521.

The first base plate 51 may be the array base plate, and the second base plate 52 is the cell base plate of the array base plate. Alternatively, the second base plate 52 is the array base plate, and the first base plate 51 is the cell base plate of the array base plate, which is not limited in the present disclosure. The following embodiments illustrate by taking the case as an example in which the second base plate 52 is the array base plate and the first base plate 51 is the cell base plate of the array base plate.

The first substrate 511 in the first base plate 51 may be a blank glass base plate. The first base plate 51 may further include a black matrix BM, a protecting layer OC and so forth, that are arranged between the first substrate 511 and the post spacer 512, and the post spacer 512 may be provided on the side of the protecting layer OC that is away from the first substrate 511.

The second substrate 521 in the second base plate 52 may be a blank glass base plate. The second base plate 52 may further include a thin-film transistor and so forth, that are arranged between the second substrate 521 and the spacing platform 522. The structure of the second base plate 52 will be described in detail in the following embodiments.

Moreover, both of the surfaces of the sides of the first base plate 51 and the second base plate 52 that are close to the liquid-crystal layer 53 are coated by an alignment film layer that induces the aligned arrangement of the liquid crystal.

In the present embodiment, the liquid-crystal layer 53 may be driven by a vertical electric field, and may also be driven by a horizontal electric field, which is not limited in the present embodiment.

In the present embodiment, the arrangement as opposite to each other refers to that the first surface and the second surface are arranged face to face. The post spacer 512 and the spacing platform 522 that are arranged opposite to each other are used to support the cell gap of the liquid-crystal layer 53.

By providing the spacing platform 522 opposite to the post spacer 512 on the second base plate 52, without changing the cell gap of the liquid-crystal layer 53, the designed height of the post spacer 512 may be reduced, to increase the distance between the first surface of the post spacer 512 and the second base plate 52.

Figure 6:
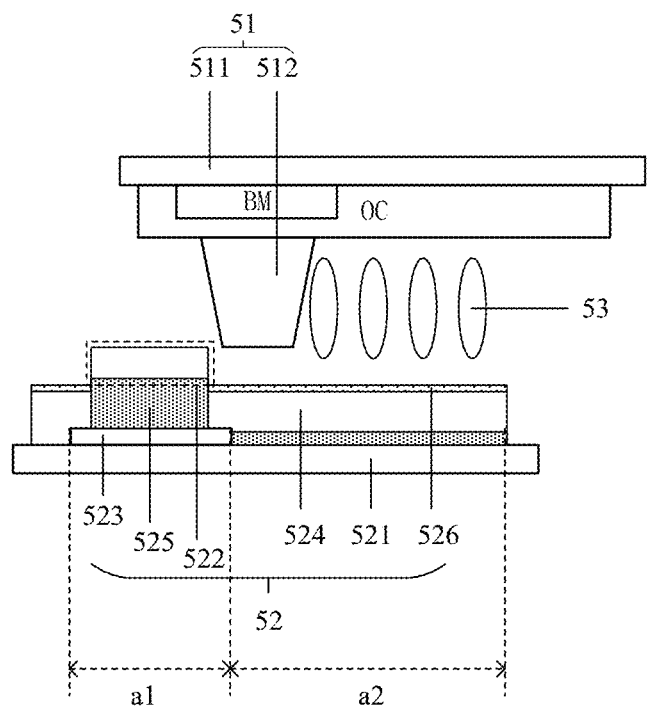
FIG. 6 shows a schematic sectional structural diagram of the display panel in a dislocation state according to an embodiment of the present disclosure.

As shown in FIG. 6, when the display panel is applied an intensive external force, the post spacer 512 provided on the first base plate 51 displaces and dislocates relative to the spacing platform 522, and the post spacer 512 intrudes into the opening area "a2" from the non-opening area "a1". Because the post spacer 512 may not touch the second base plate 52, the post spacer 512 may be prevented from scratching the alignment film at the surface of the second base plate 52, which greatly reduces the probability of bright-spot imperfects of the display panel in external-force falling tests.

The display panel according to the present embodiment, by providing the spacing platform opposite to the post spacer on the second base plate, may reduce the designed height of the post spacer, thereby increasing the distance between the first surface of the post spacer and the second base plate. When a relative displacement or dislocation between the first base plate and the second base plate happens under the effect of an external force on the display panel, the present disclosure may effectively prevent the post spacer from scratching the alignment film at the surface of the second base plate, to prevent abnormality of the alignment of the liquid crystal, so as to reduce the probability of spot imperfects of the display panel, improve the uniformity of the displaying brightness, and improve the displaying quality.

In an alternative implementation, the material of the spacing platform 522 may include an organic material. The utilization of the organic material facilitates manufacturing the spacing platform 522 of a larger thickness, to further increase the distance between the first surface of the post spacer and the second base plate.

In an alternative implementation, the geometric center of the orthographic projection of the first surface on the second substrate 521 coincides with the geometric center of the orthographic projection of the second surface on the second substrate 521.

In the present implementation, because the orthographic projection on the second substrate 521 of the first surface of the post spacer 512 is located within the area of the orthographic projection on the second substrate 521 of the second surface of the spacing platform 522, and the geometric centers of the orthographic projections of the first surface and the second surface on the second substrate 521 coincide when the post spacer 512 and the spacing platform 522 slightly dislocate therebetween, a relatively large contact area between them may still be maintained, thereby maintaining the stability of the cell gap of the liquid crystal.

In an alternative implementation, the distance between the boundary of the orthographic projection of the first surface on the second substrate 521 and the boundary of the orthographic projection of the second surface on the second substrate 521 is greater than or equal to 10 μm.

In the present implementation, the minimum distance between the boundaries of the orthographic projections on the second substrate 521 of the first surface and the second surface is greater than or equal to 10 μm. That may prevent incapability of contacting between the post spacer 512 and the spacing platform 522 or an extremely small contact area caused by an aligning deviation.

In an alternative implementation, the distance between the boundary of the orthographic projection of the spacing platform 522 on the second substrate 521 and the boundary of the non-opening area a1 is greater than or equal to 20 μm.

In the present implementation, the minimum distance between the boundary of the orthographic projection of the spacing platform 522 on the second substrate 521 and the boundary of the non-opening area "a1" is greater than or equal to 20 μm. That may prevent the alignment film that is accumulated around the spacing platform 522 in the process of the spread coating of the alignment film from diffusing to the opening area "a2", to prevent nonuniformity of the alignment film within the opening area "a2", to further improve the uniformity of the displaying brightness.

In an alternative implementation, the shape of the first surface and the shape of the second surface may be the same. For example, the shapes of the first surface and the second surface may be a circle, an elliptical shape, a polygon and so forth.

In order to increase the contact area between them, the shapes of the first surface and the second surface may be an elliptical shape or a rectangle.

In an alternative implementation, the thickness of the spacing platform 522 may be greater than or equal to 0.9 μm, and less than or equal to 1.2 μm.

In an alternative implementation, the thickness of the post spacer 512 may be greater than or equal to 2 micrometers, and less than or equal to 2.6 μm.

As compared with solutions in which the spacing platform 522 is not provided, the thickness of the post spacer 512 is greatly reduced, whereby the difficulty in the manufacture of the post spacer 512 may be reduced.

It should be noted that both of the thickness of the spacing platform 522 and the thickness of the post spacer 512 are based on the surfaces of the opening areas "a2" of the base plates where they are located. For example, the thickness of the spacing platform 522 is relative to the height of the surface of the opening area "a2" of the second base plate 52. The thickness of the post spacer 512 is relative to the height of the surface of the opening area "a2" of the first base plate 51.

Moreover, the thickness of the spacing platform 522 is the dimension of the spacing platform 522 in the direction perpendicular to the first base plate 51 or the second base plate 52. The thickness of the post spacer 512 is the dimension of the post spacer 512 in the direction perpendicular to the first base plate 51 or the second base plate 52.

In practical applications, the thickness of the spacing platform 522 and the thickness of the post spacer 512 may be regulated according to factors such as the designed cell gap of the liquid-crystal layer 53 and the process conditions, which is not limited in the present embodiment.

Figure 7:
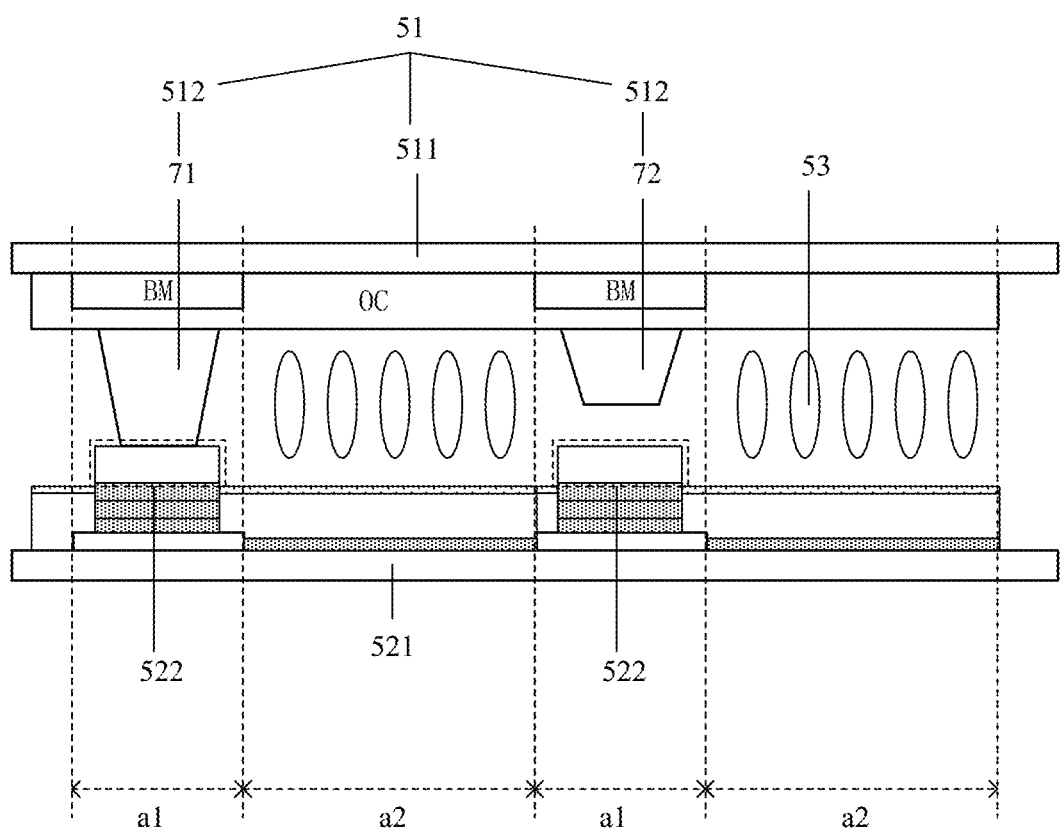
FIG. 7 shows a schematic sectional structural diagram of the display panel according to an embodiment of the present disclosure.

In an alternative implementation, referring to FIG. 7, the post spacer 512 may include a first post spacer 71, and the sum of the thickness of the first post spacer 71 and the thickness of the spacing platform 522 arranged opposite to the first post spacer 71 may be greater than the thickness of the liquid-crystal layer 53.

Because the sum of the thickness of the first post spacer 71 and the thickness of the spacing platform 522 arranged opposite to the first post spacer 71 is greater than the thickness of the liquid-crystal layer 53, the first post spacer 71 arranged opposite to the spacing platform 522 is always in the compression state and thus deforms, and the first post spacer 71 serves as the main support of the cell gap of the liquid crystal. When the first post spacer 71 dislocates and thus deviates from the spacing platform 522, the deformation of the first post spacer 71 restores.

In order to ensure that the first post spacer 71 restored from the deformation and does not scratch the alignment film at the surface of the second base plate 52, it may be set that the thickness of the spacing platform 522 arranged opposite to the first post spacer 71 is greater than the compression volume thickness of the first post spacer 71 in the compression state, to ensure that the first post spacer 71 may not contact the second base plate 52 whether in the compression state or in the state restored from the deformation, to further reduce the probability of spot imperfects.

In an alternative implementation, referring to FIG. 7, the post spacer 512 may further include a second post spacer 72, the first post spacer 71 and the second post spacer 72 are arranged opposite to different spacing platforms 522, and a sum of the thickness of the second post spacer 72 and a thickness of the spacing platform 522 arranged opposite to the second post spacer is less than the thickness of the liquid-crystal layer 53. The thickness of the first post spacer 71 is greater than the thickness of the second post spacer 72.

As shown in FIG. 7, after the first base plate 51 and the second base plate 52 are arranged in align with each other, the taller first post spacer 71 abuts the spacing platform 522, generates a certain compression volume, gets into the compression state, and serves as the main support of the cell gap. By contrast, the shorter second post spacer 72 is provided with a certain spacing from the spacing platform 522, and does not have a compression volume. When the display panel is pressed by an external force or is in a low-temperature condition, the cell gap of the liquid crystal decreases, and the first post spacer 71 is sharply compressed and may even be excessively destroyed and thus fail, the shorter second post spacer 72 contacts the spacing platform 522, to provide auxiliary support, protect the first post spacer 71 and facilitate the subsequent restoration of the first post spacer 71, thereby maintaining the normal displaying of the liquid-crystal panel.

In the present embodiment, in order to ensure that the display panel is provided with a constant cell gap, the first post spacer 71 and the second post spacer 72 may be evenly distributed on the first base plate 51.

It should be noted that the thickness of the liquid-crystal layer 53 refers to the average thickness of the liquid-crystal layer 53 in the display panel.

In an alternative implementation, referring to FIG. 5, the second base plate 52 may further include: a thin-film transistor 523 provided on the side of the second substrate 521 that is close to the spacing platform 522, and a planarization layer 524 provided on the side of the thin-film transistor 523 that is away from the second substrate 521, and the material of the spacing platform 522 includes the material of the planarization layer 524.

In the present implementation, the spacing platform 522 and the planarization layer 524 may be connected to be of an integral structure, and they may be formed at the same time. Particularly, the spacing platform 522 may be formed with the planarization layer 524 at the same time, by performing a Half-Tone patterning process to the material of the planarization layer.

In an alternative implementation, referring to FIG. 5, a color-resistance layer 525 may be provided between the thin-film transistor 523 and the planarization layer 524, the orthographic projection of the color-resistance layer 525 on the second substrate 521 covers the opening area "a2", and the material of the spacing platform 522 further includes the material of the color-resistance layer 525.

In the present implementation, the spacing platform 522 and the color-resistance layer 525 may be connected to be of an integral structure, and they may be formed at the same time.

The color-resistance layer 525 may be a red-color light-resistance layer, a blue-color light-resistance layer or a green-color light-resistance layer. The spacing platform 522 may include at least one of a red-color light-resistance layer, a blue-color light-resistance layer and a green-color light-resistance layer.

In a particular implementation, the spacing platform 522 may be formed by firstly stacking the red-color light-resistance layer, the blue-color light-resistance layer and the green-color light-resistance layer, and subsequently using a patterning process for the planarization layer. By using the Half-Tone patterning process, the spacing platform 522 may reach the required designed height.

In an alternative implementation, referring to FIG. 5, a pixel electrode 526 may be provided on the side of the planarization layer 524 that is away from the second substrate, the orthographic projection of the pixel electrode 526 on the second substrate 521 covers the opening area "a2", and the material of the planarization layer 524 includes a photoinitiator and an acrylic resin.

In the present implementation, by providing the planarization layer 524 between the pixel electrode 526 and the metal film layer of the thin-film transistor 523, the coupling capacitance between the pixel electrode 526 and the metal film layer may be reduced, to ensure that the charging rate of the thin-film transistor 523 is sufficient.

In a particular implementation, the thickness of the planarization layer 524 may be greater than or equal to 2.0 µm, and less than or equal to 2.5 µm.

Another embodiment of the present disclosure further provides a displaying device, wherein the displaying device may include the display panel according to any one of the above embodiments.

It should be noted that the displaying device according to the present embodiment may be any products or components that have the function of 2D or 3D displaying, such as an electronic paper, a mobile phone, a tablet personal computer, a TV set, a notebook computer, a digital photo frame and a navigator.

In the present embodiment, the displaying device may further include a backlight module provided on the side of the display panel. The backlight module may provide to the display panel the light rays required by the displaying. The backlight module may be a side-incidence-type backlight module, and may also be a direct-light-type backlight module.

Figure 8:
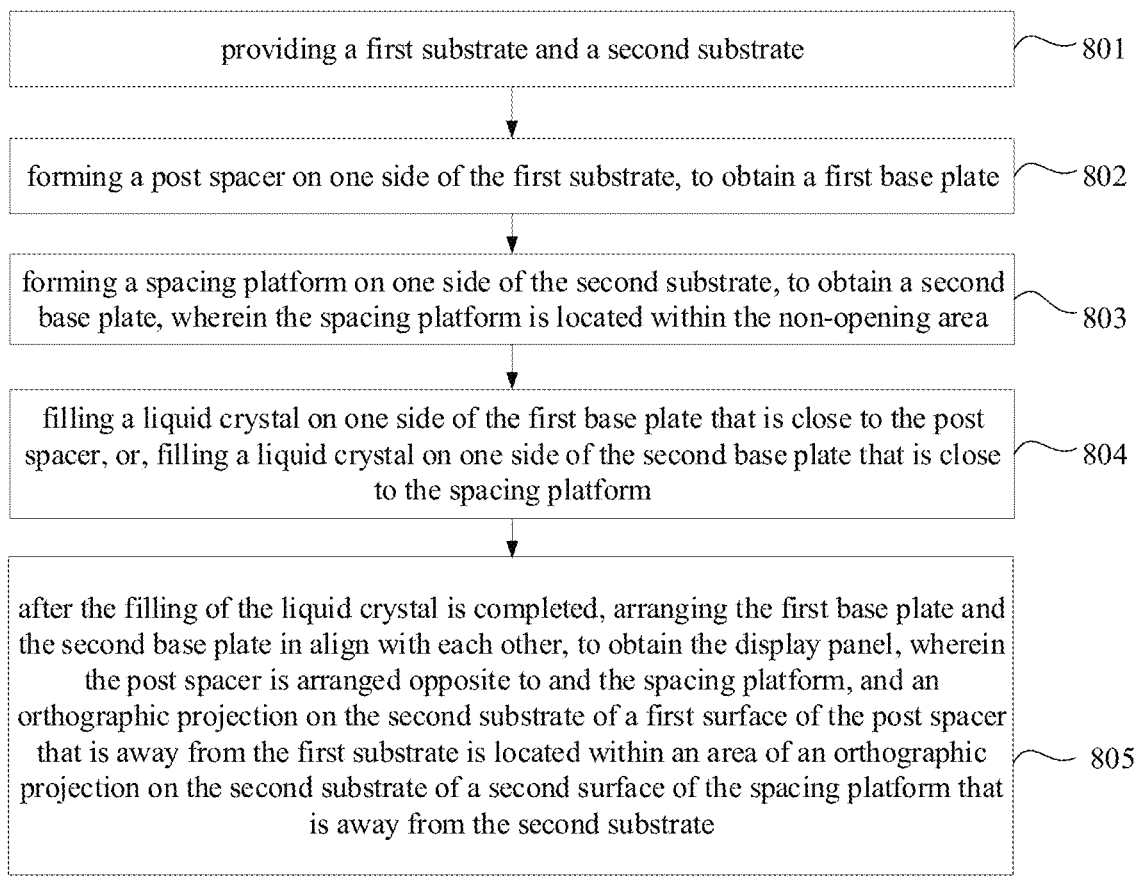
FIG. 8 shows a flow chart of the steps of the manufacturing method of a display panel according to an embodiment of the present disclosure.

Another embodiment of the present disclosure further provides a manufacturing method of a display panel, wherein the display panel includes an opening area and a non-opening area, and, referring to FIG. 8, the manufacturing method includes:

Step 801: providing a first substrate and a second substrate;

Step 802: forming a post spacer on one side of the first substrate, to obtain a first base plate;

Step 803: forming a spacing platform on one side of the second substrate, to obtain a second base plate, wherein the spacing platform is located within the non-opening area;

Step 804: filling a liquid crystal on one side of the first base plate that is close to the post spacer, or, filling a liquid crystal on one side of the second base plate that is close to the spacing platform: and Step 805: after the filling of the liquid crystal is completed, arranging the first base plate and the second base plate in align with each other, to obtain the display panel, wherein the post spacer is arranged opposite to and the spacing platform, and an orthographic projection on the second substrate of a first surface of the post spacer that is away from the first substrate is located within an area of an orthographic projection on the second substrate of a second surface of the spacing platform that is away from the second substrate.

By using the manufacturing method according to the present embodiment, the display panel according to any one of the above embodiments may be obtained. The particular structure and effect of the display panel may refer to the description on the above embodiments, and are not discussed herein further.

The embodiments of the present disclosure provide a manufacturing method of a display panel, a display panel and a displaying device, wherein the display panel includes an opening area and a non-opening area, and the display panel includes: a first base plate and a second base plate arranged in align with each other, and a liquid-crystal layer between the first base plate and the second base plate; the first base plate includes: a first substrate, and a post spacer provided on one side of the first substrate that is closer to the second base plate; the second base plate includes: a second substrate, and a spacing platform provided on one side of the second substrate that is closer to the first base plate, wherein the spacing platform is located within the non-opening area; and the post spacer and the spacing platform face each other, and an orthographic projection on the second substrate of a first surface of the post spacer that is away from the first substrate is located within an area of an orthographic projection on the second substrate of a second surface of the spacing platform that is away from the second substrate. The technical solutions of the present disclosure, by providing the spacing platform facing the post spacer, it may reduce the designed height of the post spacer, thereby increasing the distance between the first surface of the post spacer and the second base plate. When a relative displacement or dislocation between the first base plate and the second base plate happens under the effect of an external force on the display panel, the present disclosure may effectively prevent the post spacer from scratching the alignment film at the surface of the second base plate, to prevent abnormality of the alignment of the liquid crystal, reduce the probability of spot imperfects of the display panel, improve the uniformity of the displaying brightness, and improve the displaying quality.

The embodiments of the description are described in the mode of progression, each of the embodiments emphatically describes the differences from the other embodiments, and the same or similar parts of the embodiments may refer to each other.

Finally, it should also be noted that, in the present text, relation terms such as first and second are merely intended to distinguish one entity or operation from another entity or operation, and that does not necessarily require or imply that those entities or operations have therebetween any such actual relation or order. Furthermore, the terms "include", "include" or any variants thereof are intended to cover non-exclusive inclusions, so that processes, methods, articles or devices that include a series of elements do not only include those elements, but also include other elements that are not explicitly listed, or include the elements that are inherent to such processes, methods, articles or devices. Unless further limitation is set forth, an element defined by the wording "comprising a . . . " does not exclude additional same element in the process, method, article or device comprising the element.

The manufacturing method of the display panel, the display panel and the displaying device according to the present disclosure have been described in detail above. The principle and the embodiments of the present disclosure are described herein with reference to the particular examples, and the description of the above embodiments is merely intended to facilitate to understand the method according to the present disclosure and its core concept. Moreover, for a person skilled in the art, according to the concept of the present disclosure, the particular embodiments and the range of application may be varied. In conclusion, the contents of the description should not be understood as limiting the present disclosure. The "one embodiment", "an embodiment" or "one or more embodiments" as used herein means that particular features, structures or characteristics described with reference to an embodiment are included in at least one embodiment of the present disclosure. Moreover, it should be noted that here an example using the wording "in an embodiment" does not necessarily refer to the same one embodiment.

The description provided herein describes many concrete details. However, it may be understood that the embodiments of the present disclosure may be implemented without those concrete details. In some of the embodiments, well-known processes, structures and techniques are not described in detail, so as not to affect the understanding of the description.

In the claim, any reference signs between parentheses should not be construed as limiting the claim. The word "include" does not exclude elements or steps that are not listed in the claim. The word "a" or "an" preceding an element does not exclude the existing of a plurality of such elements. The present disclosure may be implemented by means of hardware comprising several different elements and by means of a properly programmed computer. In unit claim that list several devices, some of those devices may be embodied by the same item of hardware. The words first, second, third and so forth, do not denote any order. Those words may be interpreted as names.

Finally, it should be noted that the above embodiments are merely intended to explain the technical solutions of the present disclosure, and not to limit them. Although the present disclosure is explained in detail with reference to the above embodiments, a person skilled in the art should understand that he may still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present disclosure.

The invention claimed is:

1. A display panel including an opening area and a non-opening area, and the display panel comprises: a first base plate and a second base plate arranged in align with each other, and a liquid-crystal layer filled between the first base plate and the second base plate;
    the first base plate comprises: a first substrate, and a post spacer provided on one side of the first substrate that is close to the second base plate;
    the second base plate comprises: a second substrate, and a spacing platform provided on one side of the second substrate that is close to the first base plate, wherein the spacing platform is located within the non-opening area, the spacing platform and a color-resistance layer are connected to be of an integral structure, and a material of the spacing platform is a material of the color-resistance layer; and
    the post spacer is arranged opposite to the spacing platform, and an orthographic projection on the second substrate of a first surface of the post spacer that is away from the first substrate is located within an area of an orthographic projection on the second substrate of a second surface of the spacing platform that is away from the second substrate,
    wherein a distance between a boundary of the orthographic projection of the first surface on the second substrate and a boundary of the orthographic projection of the second surface on the second substrate is greater than or equal to 10 µm, a distance between a boundary of an orthographic projection of the spacing platform on the second substrate and a boundary of the non-opening area is greater than or equal to 20 µm, a thickness of the spacing platform is greater than or equal to 0.9 µm, and less than or equal to 1.2 µm, and a thickness of the post spacer is greater than or equal to 2 micrometers, and less than or equal to 2.6 µm,
    the second base plate further comprises: a thin-film transistor provided on one side of the second substrate that is close to the spacing platform, and a planarization layer provided on one side of the thin-film transistor that is away from the second substrate, and
    the color-resistance layer is provided between the thin-film transistor and the planarization layer, and an orthographic projection of the color-resistance layer on the second substrate covers the opening area.

2. The display panel according to claim 1, wherein a geometric center of the orthographic projection of the first surface on the second substrate coincides with a geometric center of the orthographic projection of the second surface on the second substrate.

3. The display panel according to claim 1, wherein a shape of the first surface and a shape of the second surface are the same.

4. The display panel according to claim 1, wherein a shape of the second surface is an elliptical shape or a rectangle.

5. The display panel according to claim 1, wherein the post spacer comprises a first post spacer, and a sum of a thickness of the first post spacer and a thickness of the spacing platform arranged opposite to the first post spacer is greater than a thickness of the liquid-crystal layer.

6. The display panel according to claim 5, wherein the first post spacer arranged opposite to the spacing platform is in a compression state, and the thickness of the spacing platform arranged opposite to the first post spacer is greater than a compression volume thickness of the first post spacer in the compression state.

7. The display panel according to claim 5, wherein the post spacer further comprises a second post spacer, the first post spacer and the second post spacer are arranged opposite to different spacing platforms, and a sum of a thickness of the second post spacer and a thickness of the spacing platform arranged opposite to the second post spacer is less than the thickness of the liquid-crystal layer.

8. The display panel according to claim 1, wherein the material of the spacing platform further comprises a material of the planarization layer.

9. The display panel according to claim 8, wherein a pixel electrode is provided on one side of the planarization layer that is away from the second substrate, an orthographic projection of the pixel electrode on the second substrate covers the opening area, and a material of the planarization layer comprises an acrylic resin and a photoinitiator.

10. The display panel according to claim 1, wherein the post spacer comprises a first post spacer and a second post spacer, a thickness of the first post spacer is great than a thickness of the second post spacer, and the first post spacer and the spacing platform are directly contacted.

11. A displaying device, wherein the displaying device comprises a display panel, the display panel including an opening area and a non-opening area, and the display panel comprises: a first base plate and a second base plate arranged in align with each other, and a liquid-crystal layer filled between the first base plate and the second base plate;
    the first base plate comprises: a first substrate, and a post spacer provided on one side of the first substrate that is close to the second base plate;
    the second base plate comprises: a second substrate, and a spacing platform provided on one side of the second substrate that is close to the first base plate, wherein the spacing platform is located within the non-opening area, the spacing platform and a color-resistance layer are connected to be of an integral structure, and a material of the spacing platform is a material of the color-resistance layer; and
    the post spacer is arranged opposite to the spacing platform, and an orthographic projection on the second substrate of a first surface of the post spacer that is away from the first substrate is located within an area of an orthographic projection on the second substrate of a second surface of the spacing platform that is away from the second substrate, wherein a distance between a boundary of the orthographic projection of the first surface on the second substrate and a boundary of the orthographic projection of the second surface on the second substrate is greater than or equal to 10 μm, a distance between a boundary of an orthographic projection of the spacing platform on the second substrate and a boundary of the non-opening area is greater than or equal to 20 μm, a thickness of the spacing platform is greater than or equal to 0.9 μm, and less than or equal to 1.2 μm, and a thickness of the post spacer is greater than or equal to 2 micrometers, and less than or equal to 2.6 μm, the second base plate further comprises: a thin-film transistor provided on one side of the second substrate that is close to the spacing platform, and a planarization layer provided on one side of the thin-film transistor that is away from the second substrate, and the color-resistance layer is provided between the thin-film transistor and the planarization layer, and an orthographic projection of the color-resistance layer on the second substrate covers the opening area.

12. The displaying device according to claim 11, wherein a geometric center of the orthographic projection of the first surface on the second substrate coincides with a geometric center of the orthographic projection of the second surface on the second substrate.

13. The displaying device according to claim 11, wherein a shape of the first surface and a shape of the second surface are the same.

14. A manufacturing method of a display panel, wherein the display panel comprises an opening area and a non-opening area, and the manufacturing method comprises:

providing a first substrate and a second substrate;

forming a post spacer on one side of the first substrate, to obtain a first base plate;

forming a spacing platform on one side of the second substrate, to obtain a second base plate, wherein the spacing platform is located within the non-opening area, the spacing platform and a color-resistance layer are connected to be of an integral structure, and a material of the spacing platform is a material of the color-resistance layer;

filling a liquid crystal on one side of the first base plate that is close to the post spacer, or, filling a liquid crystal on one side of the second base plate that is close to the spacing platform; and after the filling of the liquid crystal is completed, arranging the first base plate and the second base plate in align with each other, to obtain the display panel, wherein the post spacer is arranged opposite to the spacing platform, and an orthographic projection on the second substrate of a first surface of the post spacer that is away from the first substrate is located within an area of an orthographic projection on the second substrate of a second surface of the spacing platform that is away from the second substrate, wherein a distance between a boundary of the orthographic projection of the first surface on the second substrate and a boundary of the orthographic projection of the second surface on the second substrate is greater than or equal to 10 μm, a distance between a boundary of an orthographic projection of the spacing platform on the second substrate and a boundary of the non-opening area is greater than or equal to 20 μm, a thickness of the spacing platform is greater than or equal to 0.9 μm, and less than or equal to 1.2 μm, and a thickness of the post spacer is greater than or equal to 2 micrometers, and less than or equal to 2.6 μm, the second base plate further comprises: a thin-film transistor provided on one side of the second substrate that is close to the spacing platform, and a planarization layer provided on one side of the thin-film transistor that is away from the second substrate, and the color-resistance layer is provided between the thin-film transistor and the planarization layer, and an orthographic projection of the color-resistance layer on the second substrate covers the opening area.

* * * * *